United States Patent
Okubo et al.

(10) Patent No.: US 10,029,673 B2
(45) Date of Patent: Jul. 24, 2018

(54) SPEED LIMITING OF ALTITUDE COMPENSATION FOR TARGET ENGINE SPEED IN HYBRID ELECTRIC VEHICLES

(71) Applicant: Ford Global Technologies, LLC, Dearborn, MI (US)

(72) Inventors: Shunsuke Okubo, Belleville, MI (US); Carol Louise Okubo, Belleville, MI (US); Alan Robert Dona, Huntington Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/133,246

(22) Filed: Apr. 20, 2016

(65) Prior Publication Data
US 2017/0305412 A1    Oct. 26, 2017

(51) Int. Cl.
*B60W 20/17* (2016.01)
*B60W 10/06* (2006.01)
(Continued)

(52) U.S. Cl.
CPC ............ *B60W 20/17* (2016.01); *B60W 10/06* (2013.01); *B60W 10/08* (2013.01); *B60W 20/13* (2016.01); *F02D 11/105* (2013.01); *F02D 31/001* (2013.01); *B60W 2510/0666* (2013.01); *B60W 2710/0644* (2013.01); (Continued)

(58) Field of Classification Search
CPC ...... B60W 20/17; B60W 20/13; B60W 10/06; B60W 10/08; B60W 2510/0666; B60W 2710/0644; B60W 2710/0677; B60W 2710/086; F02D 41/0097; F02D 41/1498; Y01S 903/905; Y01S 903/93
See application file for complete search history.

(56) References Cited

U.S. PATENT DOCUMENTS 4,572,141 A * 2/1986 Hasegawa ............ F02D 31/005
                                                 123/339.22
5,166,879 A * 11/1992 Greene ................... F16H 59/62
                                                      477/125
(Continued)

FOREIGN PATENT DOCUMENTS

CN         1944136 A      4/2007

OTHER PUBLICATIONS

Chinese Office Action for Chinese Patent Application No. 201410099198.3 dated Jun. 14, 2017.

*Primary Examiner* — Behrang Badii
*Assistant Examiner* — Daniel L Greene
(74) *Attorney, Agent, or Firm* — David B. Kelley; Brooks Kushman P.C.

(57) ABSTRACT

A system and method for controlling a hybrid vehicle having an engine, first and second electric machines coupled to a traction battery and configured to operate primarily as a motor and a generator, respectively, and a controller in communication with the engine and the first and second electric machines include increasing target engine speed from a sea level speed to deliver a demanded engine power at altitude up to an NVH engine speed limit. The system and method may reduce the demanded engine power based on an attainable engine power associated with the NVH engine speed limit. A demanded wheel power may be reduced in response to the reduced engine power.

20 Claims, 4 Drawing Sheets

(51) Int. Cl.
  *B60W 10/08* (2006.01)
  *B60W 20/13* (2016.01)
  *F02D 11/10* (2006.01)
  *F02D 31/00* (2006.01)

(52) U.S. Cl.
  CPC .............. *B60W 2710/0677* (2013.01); *B60W 2710/086* (2013.01); *F02D 2200/703* (2013.01); *Y10S 903/905* (2013.01); *Y10S 903/93* (2013.01)

(56) References Cited

U.S. PATENT DOCUMENTS

| | | | |
|---|---|---|---|
| 5,673,676 A * | 10/1997 | Mukumoto | F02D 41/2461 123/673 |
| 6,234,149 B1 * | 5/2001 | Mills | F02D 41/0007 123/486 |
| 6,408,968 B1 * | 6/2002 | Wakashiro | B60K 6/485 180/65.26 |
| 6,719,076 B1 | 4/2004 | Tabata et al. | |
| 7,236,873 B2 | 6/2007 | Kuang et al. | |
| 7,340,330 B2 | 3/2008 | Okoshi et al. | |
| 2002/0108794 A1 | 8/2002 | Wakashiro et al. | |
| 2004/0107040 A1 * | 6/2004 | Edwards, II | F02D 41/021 701/110 |
| 2004/0130442 A1 * | 7/2004 | Breed | B60C 11/24 340/443 |
| 2005/0050887 A1 | 3/2005 | Frank et al. | |
| 2005/0076882 A1 | 4/2005 | Rayl | |
| 2005/0192727 A1 * | 9/2005 | Shostak | B60C 11/24 701/37 |
| 2008/0308066 A1 | 12/2008 | Martin et al. | |
| 2009/0188939 A1 | 5/2009 | Heap et al. | |
| 2012/0072061 A1 | 3/2012 | Kim | |
| 2013/0166121 A1 | 6/2013 | Takeuchi et al. | |
| 2014/0257598 A1 * | 9/2014 | Bailey | G05D 1/101 701/3 |
| 2014/0278002 A1 | 9/2014 | Okubo | |
| 2016/0376003 A1 * | 12/2016 | Feldman | B64C 39/005 703/2 |

* cited by examiner

SPEED LIMITING OF ALTITUDE COMPENSATION FOR TARGET ENGINE SPEED IN HYBRID ELECTRIC VEHICLES

CROSS-REFERENCE TO RELATED APPLICATION

This application is related to commonly owned U.S. Ser. No. 13/834,218 filed Mar. 15, 2013, now U.S. Publication No. 2014/0278002, the disclosure of which is incorporated by reference in its entirety.

TECHNICAL FIELD

This disclosure relates to hybrid electric vehicles and compensating for altitude conditions when setting a target engine speed with consideration for noise, vibration, and harshness (NVH) effects.

BACKGROUND

Hybrid electric vehicles may include a generator that may be used to control the speed of an engine. In response to a wheel power demand, a controller determines a corresponding engine power and electric motor power with the engine power used to select a target engine speed and torque. The target engine speed and torque may be selected based on various ambient and operating conditions using a calibratable table or map, which may be referred to as the energy management system (EMS) map. The EMS map is calibrated to achieve desired fuel economy based on various other considerations, including performance, emissions, and vehicle NVH, for example. The EMS map is generally calibrated based on sea level engine performance.

Some environmental and ambient operating conditions, such as higher altitudes (lower barometric pressure), higher ambient temperatures, or operating with an engine or component anomaly (such as a fouled spark plug, dirty fuel injector, restricted airflow, etc.), the torque available or attainable by the engine may be reduced at some or all engine speeds relative to the expected torque associated with an engine speed, temperature, etc. as contained in the EMS map. At such conditions, the engine may be incapable of supplying the torque specified by the EMS map at the target speed and the engine will not deliver the requested power at the EMS target speed. The vehicle system controller may then increase the engine speed to an operating point where the engine may deliver sufficient torque to satisfy the power demand.

For moderate accelerator pedal operation, the altitude compensated engine speed may be much higher than the engine speed would be at sea level and nominal ambient temperatures for the same power demand. The NVH associated with these high engine speeds may be objectionable to some customers. Furthermore, small changes in accelerator pedal position and associated power demand may result in large changes in engine speed without a proportional change in vehicle acceleration.

SUMMARY

A system and method for controlling a hybrid electric vehicle having an engine, first and second electric machines coupled to a traction battery and configured to operate primarily as a motor and a generator, respectively, and a controller in communication with the engine and the first and second electric machines include increasing target engine speed from a sea level speed to deliver a demanded engine power at altitude up to an NVH engine speed limit. The system and method may include reducing the demanded engine power in response to the demanded engine power exceeding an engine power attainable at the NVH engine speed limit. The demanded engine power may be calculated based on a difference between a demanded wheel power and an electric machine or motor power. In some embodiments, the demanded wheel power may be reduced based on reducing the demanded engine power. The NVH engine speed limit may be empirically determined based on the sea level engine speed and an NVH level that may be objectionable to vehicle occupants.

In one or more embodiments, an NVH engine speed limit includes a piecewise linear function of sea level engine speed and is applied only to sea level engine speeds below a corresponding engine speed threshold. Embodiments may include calculating engine power attainable at the increased target engine speed, reducing demanded engine power based on a difference between the engine power attainable at the increased target engine speed and engine power attainable at the NVH engine speed limit, and reducing demanded wheel power in response to the reduced demanded engine power.

Various embodiments may provide associated advantages. For example, one or more embodiments may control engine speed to limit NVH while providing sea level performance at higher altitudes or under operating conditions where reduced engine torque is attainable. Embodiments may control engine speed to provide reduced performance when the compensated engine speed would otherwise result in potentially objectionable NVH.

The above advantages and other advantages and features of the present disclosure will be readily apparent from the following detailed description of the representative embodiments when taken in connection with the accompanying drawings.

DETAILED DESCRIPTION

Representative embodiments are described as required. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed are not to be interpreted as limiting, but merely as a representative basis for teaching one of ordinary skill in the art to variously employ the embodiments.

As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As described in greater detail with reference to FIGS. 1-6, various hybrid vehicle configurations provide gearing arrangements between the engine, motor/generator, and wheels that operate similar to a continuously variable transmission (CVT). CVT-like operation allows the system to deliver nearly identical performance at sea level and altitude up to the maximum system power available, at which point a further increase in accelerator pedal demand will produce no further acceleration. Various embodiments according to this disclosure deliver sea-level performance at higher altitudes provided the NVH associated with the target engine speed is not excessive (such as at low to moderate power demands and/or when the reduction in engine capability is small), but provide reduced performance when the altitude-compensated engine speed would otherwise result in NVH that may be objectionable to some customers.

Figure 1:
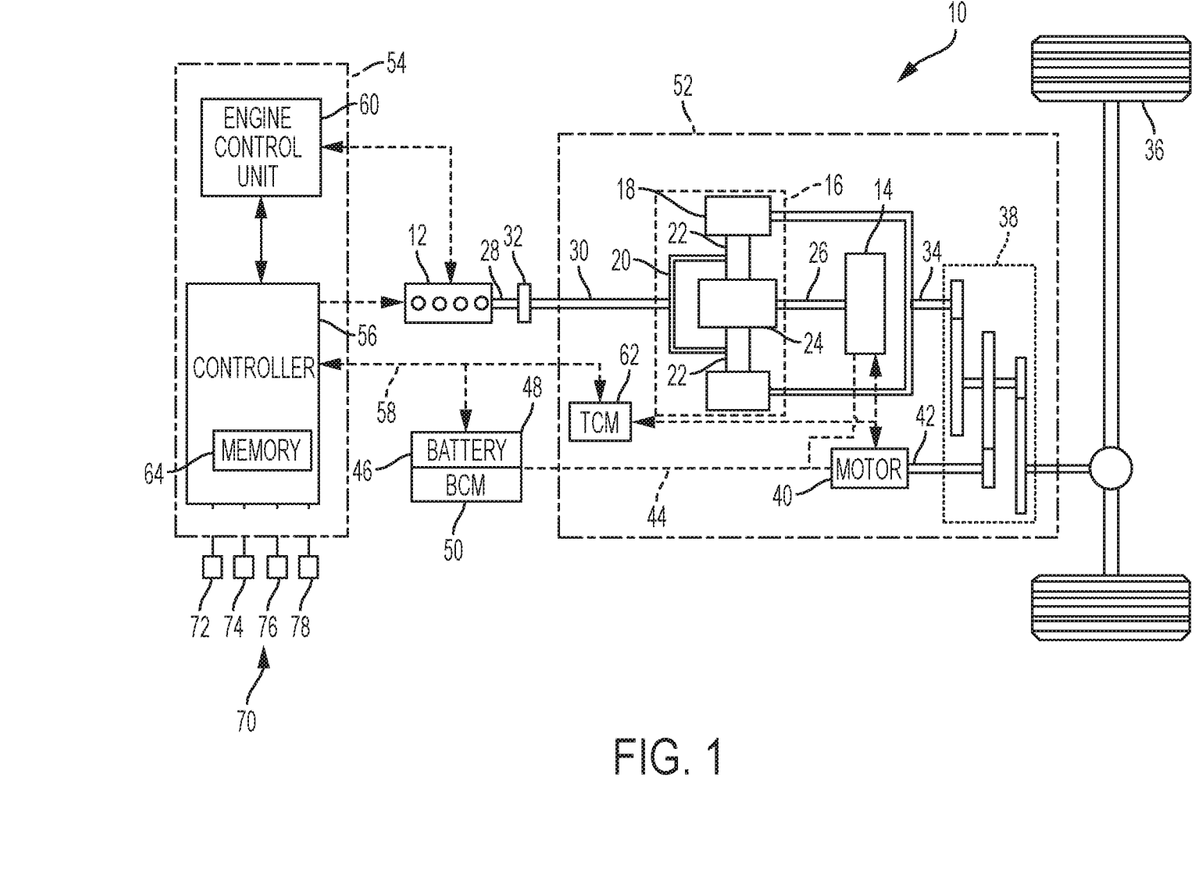
FIG. 1 is a representative hybrid vehicle with compensated engine speed limited based on expected NVH according to one embodiment of the present disclosure.

Referring to FIG. 1, a hybrid electric vehicle (HEV) 10 may include a parallel hybrid powertrain, which may be referred to as a power-split powertrain or powersplit configuration. HEV 10 may include an internal combustion engine 12 and an electric machine 14. Electric machine 14 may function as a motor, a generator, or both depending on the operating mode, but is generally referred to according to a primary function or mode of operation within the system. In the representative embodiment of FIG. 1, electric machine 14 is referred to as a generator 14 because it primarily functions as a generator during operation. However, electric machine 14 may also be operated as a motor under some operating conditions.

Engine 12 and generator 14 may be connected through a power transfer arrangement represented by a planetary gear arrangement 16 in this embodiment. Of course, other types of power transfer arrangements, including other gear sets and transmissions, may be used to connect engine 12 to generator 14 depending on the particular application and implementation. Planetary gear arrangement 16 includes a ring gear 18, a carrier 20, planet gears 22, and a sun gear 24. Generator 14 can output torque to a shaft 26 connected to sun gear 24. Similarly, engine 12 can output torque to a crankshaft 28, which may be connected to a shaft 30 through a damper or passive clutch 32. A shaft 30 may be connected to carrier 20 of planetary gear arrangement 16, with ring gear 18 connected to a shaft 34. Shaft 34 may be connected to a first set of vehicle drive wheels, or primary drive wheels 36 through a gear set 38.

HEV 10 may include a second electric machine 40, which may also function as a motor, a generator, or both, depending on the operating mode. In the representative embodiment illustrated, electric machine 40 operates primarily as a motor and will be referred to as motor 40. Motor 40 can be used to output torque to a shaft 42 connected to gear set 38 comprising a plurality of continuously meshing gears selected to provide desired torque multiplication to wheels 36. Gear set 38 provides operation similar to a vehicle having a powertrain with a CVT.

Other embodiments may include different vehicle configurations having a different number or configuration of electric machines, for example. As noted above, the elements of the electric machine arrangement including motor 40 and generator 14 can both be used as motors to output torque, or as generators to output electrical power to a high voltage bus 44 and to an energy storage system 46, which may include a traction battery or battery pack 48 and an associated battery control module (BCM) 50.

Traction battery 48 may be a high voltage battery capable of outputting electrical power to operate motor 40 and generator 14. BCM 50 may act as a controller for traction battery 48. Other types of energy storage systems can be used with a vehicle, such as vehicle 10. For example, a device such as a capacitor can be used. Similar to a high voltage battery, a capacitor or capacitor bank is capable of both storing and outputting electrical energy. Alternatively, a device such as a fuel cell may be used in conjunction with a battery and/or capacitor to provide electrical power for vehicle 10.

As shown in FIG. 1, motor 40, generator 14, planetary gear arrangement 16, and gear set 38 may generally be referred to as a transmission 52. Although depicted as a powersplit device in FIG. 1, other HEV powertrain configurations may be employed, such as parallel or series HEVs. A powertrain control module (PCM) 54 may be used to control engine 12 and components of transmission 52, including generator 14 and motor 40. PCM 54 may include a vehicle system controller (VSC), shown generally as controller 56. Although illustrated as a single controller, VSC 56 may include controllers that may be used to control multiple vehicle systems. PCM 54 may include both software embedded within VSC 56 and/or separate hardware to control various vehicle systems.

One or more controllers, such as PCM 54, may include an associated memory 64, which generally represents any of a variety of non-transitory computer readable storage media. Memory 64 may include temporary or volatile memory as well as persistent or non-volatile memory implemented by various memory technologies, such as flash, RAM, PROM, EPROM, EEPROM, magnetic disk, SSD, etc, Memory 64 may be used to store program instructions or software executed by one or more processors to control HEV 10 as described with respect to the representative embodiments. Memory 64 may also store various calibration and operating parameters and variables. In various embodiments, memory 64 includes data arranged or stored in an array, lookup table, or map that may be accessed or indexed by one or more measured, calculated, or estimated parameters, such as temperature, barometric pressure, vehicle speed, wheel power, etc.

A controller area network (CAN) 58 may allow various controllers or control modules to communicate with one another as well as various vehicle sensors and actuators indicated generally at 70. For example, VSC 56 may communicate with transmission 52 and BCM 50 using CAN 58. Other devices controlled by VSC 56 may have associated controllers or modules. For example, an engine control unit (ECU) 60 may communicate with VSC 56 and may perform control functions for engine 12, such as controlling engine speed based on an altitude compensated NVH engine speed limit. Similarly, transmission 52 may include a transmission control module (TCM) 62 configured to coordinate control of specific components within transmission 52, such as generator 14 and/or motor 40. One or more controllers may coordinate control of vehicle systems or subsystems having associated sensors and actuators and may be collectively referred to as a control system. Although illustrated and described in the context of an HEV, it is understood that embodiments of the present disclosure may be implemented on other types of vehicles including plug-in hybrid electric vehicles (PHEVs), for example.

FIG. 1 also illustrates simplified schematic representations of sensors, actuators, inputs, and outputs 70 that may be associated with PCM 54. The sensors, actuators, inputs, and outputs 70 may communicate directly or indirectly with PCM 54 using a wired or wireless connection and may be communicated by or through one or more other controllers. In the representative embodiment illustrated, the sensors, actuators, inputs, and outputs 70 include engine sensors 72 (such as a barometric pressure sensor, ambient temperature sensor, coolant temperature sensor, engine speed sensor, torque sensor, etc.), engine actuators 74 (such as a spark plug ignition system, fuel injectors, variable cam timing system, electronic throttle valve, etc.), operator sensors 76 (such as an accelerator pedal position sensor, brake pedal position sensor, ignition key, operating mode switch, drive range selector, etc.), and display outputs 78 (such as a human-machine interface, instrument panel, status lights, etc.). Various other controllers may communicate control parameters and/or sensor information to PCM 54 over CAN 58. In one embodiment, BCM 50 communicates a battery state of charge (SOC) associated with traction battery 46. Other information, such as wheel speed, wheel torque, vehicle speed, etc. may also be communicated or input to PCM 54.

During vehicle operation, shaft 30 powers planetary gear set 16 through carrier assembly 20 that rotates ring gear 18 and/or sun gear 24, which is driveably connected to generator 14. Generator 14 may be engaged with sun gear 24 such that generator 14 may selectively rotate with sun gear 24. When engine 12 is driveably coupled to planetary gear set 16, generator 14 generates energy as a reactionary element to the operation of planetary gear set 16. Electric energy generated from generator 14 is transferred to battery 48 through electrical connections or bus 44. Traction battery 48 also receives and stores electric energy generated through regenerative braking. Battery 48 supplies the stored electric energy to motor 40 to propel the vehicle during various operating modes. The portion of the power delivered from engine 12 to generator 14 may also be transmitted directly to motor 40. The PCM 54 coordinates control of the components in the powertrain to provide proper torque distribution to wheels 36 to deliver a driver demanded wheel power.

HEV 10 may be powered by engine 12 alone, by traction battery 48 and motor 40 alone, or by a combination of engine 12 with battery 48 and motor 40 depending on the operating mode and operating conditions. In a mechanical drive mode, or a first mode of operation, engine 12 is controlled to deliver torque through planetary gear set 16. Ring gear 18 distributes torque to gear set 38. In the mechanical drive mode, motor 40 may also be activated to assist engine 12 in powering transmission 52.

In an electric drive mode (EV mode), or a second mode of operation, engine 12 is disabled or otherwise prevented from distributing torque to shaft 30. In the EV mode, battery 48 powers motor 40 to distribute torque through gear set 38 and an associated output shaft and differential to distribute torque to traction wheels 36. The PCM 54 controls battery 48, motor 40, engine 12, and generator 14 to distribute torque to wheels 36 in either the mechanical drive mode or the EV mode according to driver torque demands, which may be determined based on various driver inputs, such as accelerator pedal position, selected gear range, and selected operating mode, for example.

The powertrain configuration illustrated in the representative embodiment of FIG. 1 allows the rotational speed of engine 12 to be controlled independently of the vehicle speed by controlling speed of generator 14 acting as a reactionary element. As described in greater detail below, the engine speed is controlled to provide a desired engine torque for current ambient and operating conditions to satisfy a driver demanded wheel power. The target engine speed may be increased from a sea level target speed if the associated sea level engine torque is not attainable due to the ambient or engine operating conditions, such as may occur when operating at higher altitudes (lower barometric pressure and associated air density), higher ambient temperatures (lower air density), or with engine component performance degradation. The compensated target engine speed may be limited based on anticipated NVH to prevent NVH that may be objectionable to vehicle occupants.

It should be understood that while a power-split powertrain is illustrated in the representative embodiment of FIG. 1, HEV 10 can include many other configurations. As such, it is contemplated that individual components of the powertrain may differ to suit various particular applications. For example, in another configuration that does not include a planetary gear set 16, an electric machine (motor/generator) can be provided to operate as a generator by receiving torque from the engine or regenerative braking, while the same electric machine can also operate as a motor by receiving power from the traction battery and providing torque through the transmission. Other vehicle or powertrain configurations are contemplated and are therefore considered to be within the scope of the present disclosure.

Figure 2:
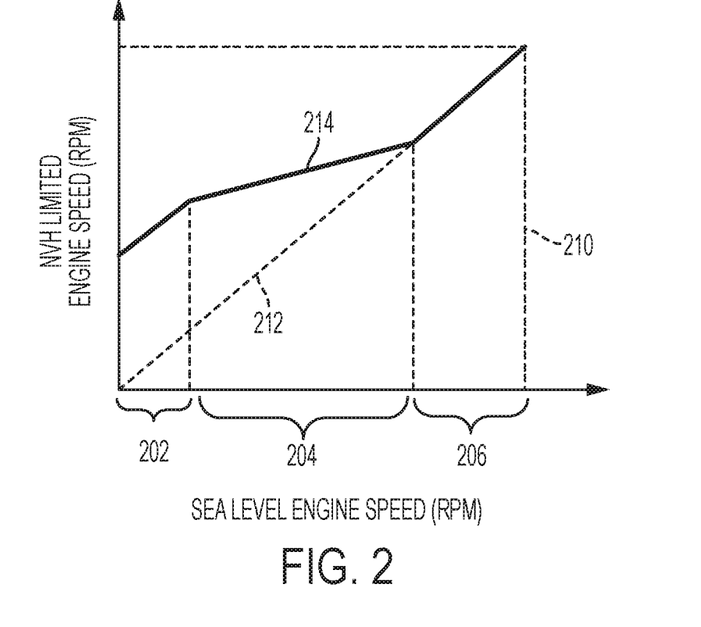
FIG. 2 illustrates a representative NVH limited engine speed determination based on sea level engine speed according to one embodiment.

FIG. 2 is a graph illustrating determination of a compensated engine speed in a system or method for controlling engine speed according to one or more embodiments of the present disclosure. The graph of FIG. 2 may be implemented or stored in memory as a multi-dimensional look-up table or array with discrete values using interpolation to determine values between the stored discrete values. Alternatively, the graph of FIG. 2 may be implemented by one or more equations stored in memory to calculate an output value of NVH limited engine speed based on an input value of sea level engine speed. The equations or values may be empirically determined or set during vehicle development to limit engine speed based on anticipated NVH that may otherwise be objectionable to vehicle occupants.

In the representative embodiment illustrated in FIG. 2, NVH limited engine speed is plotted as a piecewise linear function of sea level engine speed (which may be linear or nonlinear). Other relationships between the NVH limited engine speed and sea level engine speed may be used depending on the particular application and implementation. The representative embodiment illustrated includes three operating ranges, regions, or zones. Other embodiments may have a different number of operating ranges, regions, or zones. A first range 202 corresponds to sea level engine speeds where full wheel power is available based on the compensated engine speed NVH being below a threshold deemed to be acceptable for a particular application and operation. A second range 204 corresponds to sea level engine speeds where altitude or other operational engine speed compensation has a limited range of authority and some reduction in initially requested wheel power may be imposed to satisfy NVH performance parameters. A third rage 206 corresponds to high sea level engine speeds where no engine speed compensation is provided and accordingly no altitude compensation is applied.

In the graph of FIG. 2, line 210 represents maximum engine speed. Line 212 represents the sea level target engine speed determined to provide a target engine torque (or power) corresponding to a demanded wheel power for a current accelerator pedal position and vehicle speed. As described in greater detail with respect to FIGS. 3-6, some or all of the demanded wheel power may be provided by the engine, electric machine(s), or both depending on the particular operating mode and operating conditions, such as the battery SOC, for example. Line 214 represents the compensated engine speed subject to NVH limiting in at least the first and second operating regions 202 and 204, respectively. No engine speed compensation is performed in the third region 206 in this embodiment as previously described.

As such, line 214 represents engine speeds with an associated acceptable level of NVH in regions 202, 204. The values may be stored in a calibration table used to determine an engine speed limit for altitude compensation as a function of the engine speed which would have been commanded at sea level for the same accelerator pedal position. The altitude compensation strategy is then limited to the engine speed as represented by line 214. If the pedal demand or wheel power can be satisfied with an engine speed at or below this limit (such as at low pedal demand, or when operating with small or no reduction in engine capability), then the full accelerator pedal demanded wheel power can be provided at the wheels. If the pedal demand cannot be met when constrained to this limited engine speed as represented by line 214, then the wheel power command is reduced accordingly to avoid depleting the battery by providing the wheel power using the electric motor. The PCM 54 (FIG. 1) calculates the engine power available at the altitude compensation engine speed limit (using the maximum torque signal from the ECU 60, FIG. 1), and determines the amount by which the power demand exceeds this threshold. The PCM will reduce the wheel power command by this amount as illustrated and described with reference to FIGS. 3-6.

Figure 3:
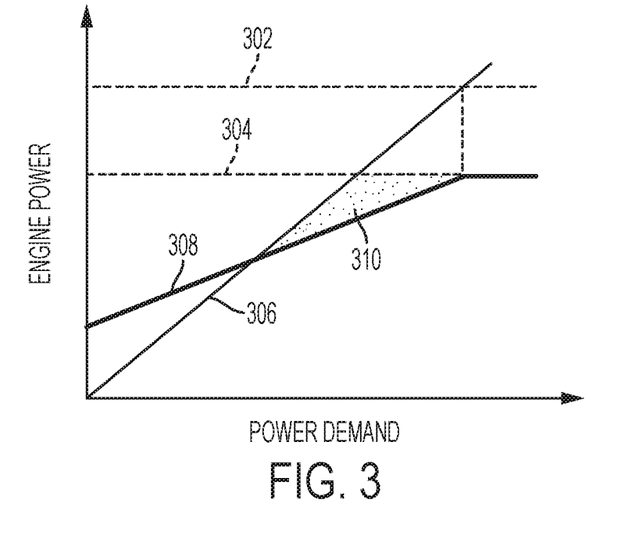
FIG. 3 illustrates wheel power reduction to limit engine speed and associated NVH according to one embodiment.

FIG. 3 is a graph illustrating reduction of an engine power command in a system or method for HEV control according to one or more embodiments. The graph of FIG. 3 illustrates reducing an engine power command so that the NVH limited engine speed can satisfy the reduced engine power attainable or available for current engine and ambient operating conditions. Line 302 represents maximum engine power at sea level with the engine function unimpaired by any component degradation. Line 304 represents maximum engine power attainable under current operating conditions, such as high altitude or operating in a failure mode or with component degradation. Engine power demand is represented by line 306, and power available at the NVH limited compensated engine speed is represented by line 308. Shaded area 310 represents a reduction in wheel power from the engine power demand at sea level relative to the engine power attainable as represented by line 308.

Figure 4:
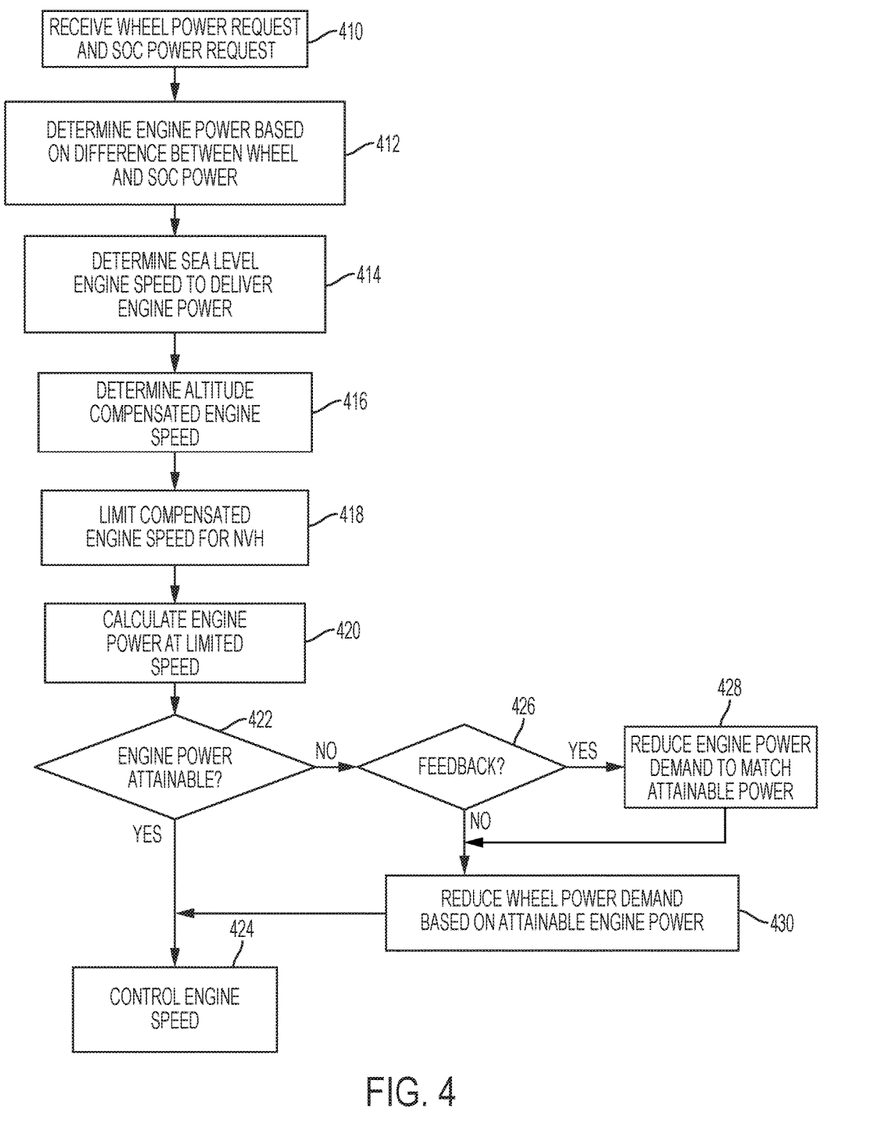
FIG. 4 is a flow chart illustrating operation of a system or method for engine speed limiting according to various embodiments.
Figure 5:
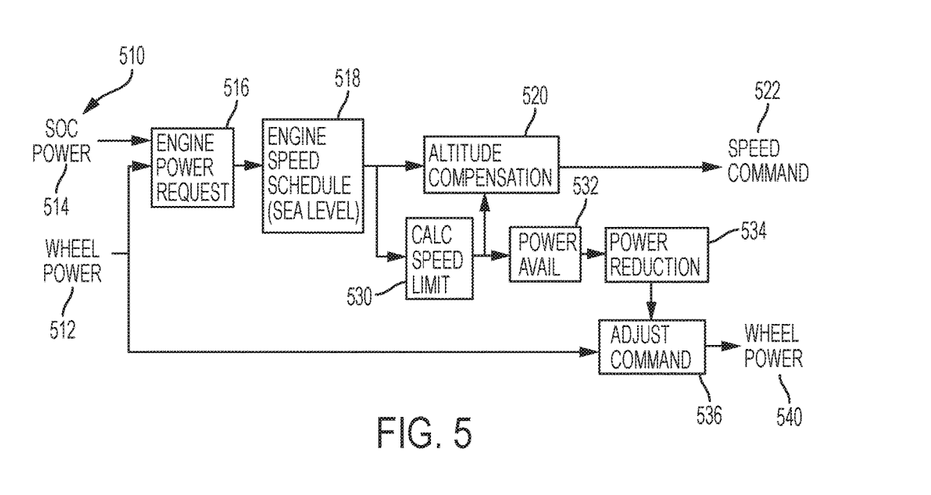
FIG. 5 is a block diagram illustrating operation of a representative hybrid vehicle control system to limit engine speed according to one embodiment.
Figure 6:
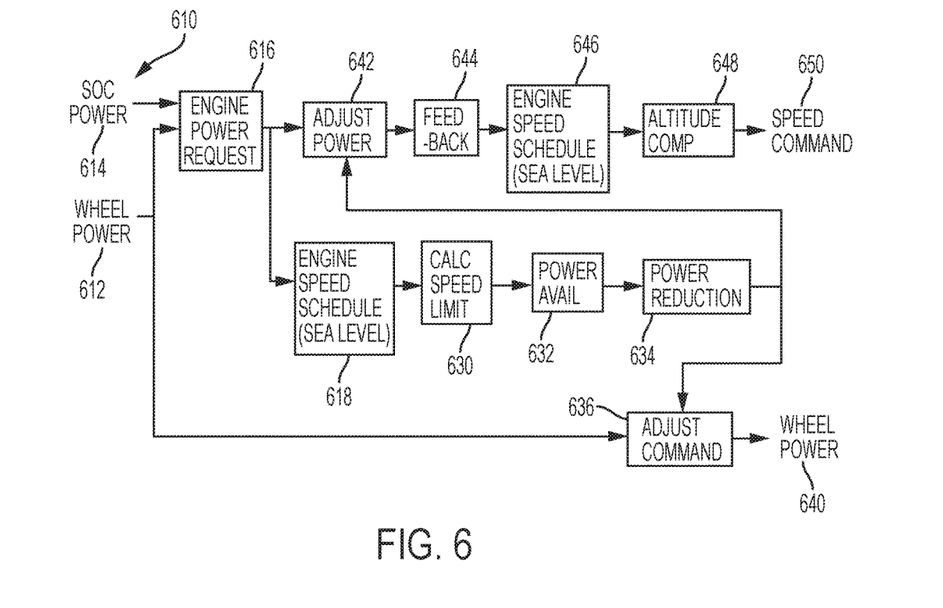
FIG. 6 is a block diagram illustrating operation of a representative embodiment of a hybrid vehicle control system having engine power feedback control.

FIGS. 4-6 illustrate operation of a system or method for controlling an HEV to provide NVH limited engine speed compensation. The diagrams of FIGS. 4-6 provide a representative control strategy for an HEV having an internal combustion engine and one or more electric machines according to representative embodiments of the present disclosure. The control strategy and/or logic illustrated in FIGS. 4-6 is generally stored as instructions or code implemented by software and/or hardware in PCM 45 and/or related vehicle controllers. The instructions or code may be processed using any of a number of known strategies such as event-driven, interrupt-driven, multi-tasking, multi-threading, and the like. As such, various steps or functions illustrated may be performed in the sequence illustrated, in parallel, or in some cases omitted. Although not explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic or code represented by the simplified diagrams of FIGS. 4-6 may be implemented primarily in software with instructions executed by a microprocessor-based vehicle, engine, and/or powertrain controller, such as VSC 56 or EC 60 (FIG. 1). Of course, the control logic may be implemented in software, hardware, or a combination of software and hardware in one or more controllers depending upon the particular application. When implemented in software, the control logic or instructions may be stored in one or more non-transitory computer readable storage media having stored data representing code or instructions executed by a computer to control the engine. The computer readable storage media may include one or more of a number of known physical devices which utilize electric, magnetic, optical, and/or hybrid storage to store executable instructions and associated calibration information, operating variables, and the like.

FIG. 4 is a simplified flowchart illustrating operation of a system or method for controlling a vehicle according to representative embodiments. A wheel power request and SOC power request are received at 410. As previously described, the wheel power request or demand may be determined by accelerator pedal position, vehicle speed, and various other operating and ambient parameters. Similarly, the SOC power request may be determined based on the operating mode and various other operating and ambient parameters, such as traction battery SOC and temperature, for example. The requested or demanded engine power is then determined based on a difference between the demanded wheel power and the SOC power at 412. The resulting engine power is used to determine a corresponding sea level engine speed to deliver the engine power at 414. As previously described, the sea level engine speed may be determined using a lookup table or equation, and may be based on additional operating and ambient parameters in some embodiments.

As indicated at block 416, the sea level engine speed is then compensated for operating and ambient parameters that may affect the ability of the engine to deliver the demanded engine power at the sea level engine speed. In the representative embodiment illustrated, the sea level engine speed is used to determine an altitude compensated engine speed at 416. The compensated engine speed is then limited for NVH at 418. As previously illustrated and described with reference to FIG. 2, the NVH limited engine speed may be determined empirically and may vary by application based on the anticipated NVH levels that may be objectionable to vehicle occupants. The NVH limit may be applied to engine speeds within a particular engine speed range. In one embodiment, the NVH limit is applied to engine speeds below a corresponding engine speed threshold.

The engine power at the NVH limited engine speed is calculated at 420. If the engine power at the limited speed is attainable based on current engine and ambient operating conditions as indicated at 422, then the engine speed command is used to control the engine speed to deliver the demanded engine power as represented at 424. Stated differently, if the demanded engine power at the compensated engine speed is at or below the NVH engine speed limit, the engine can attain or produce the demanded torque and power at the compensated engine speed. If the engine power is not attainable at 422 because the NVH limit is below the compensated engine speed that would be required to deliver the demanded engine power, then the wheel power demand is reduced to match the currently attainable engine power at the NVH limited speed at 430 in implementations that do not include engine power feedback as represented at 426 and illustrated in FIG. 5.

If the system or method does include engine power feedback as represented at 426 and illustrated and described in greater detail with reference to FIG. 6, then the target engine power command is also reduced accordingly at 428 to prevent the feedback from attempting to deliver the full engine power demand (which will not be available at the NVH speed limit). Whether or not the system or method include engine power feedback, reducing the wheel power demand based on the attainable engine power prevents the feedback control from increasing the SOC power to compensate for the reduced engine power. The reduced wheel power demand is then used to determine an associated engine speed command with the engine speed controlled to the commanded speed as represented at 424.

FIG. 5 is a block diagram illustrating operation of a system or method for controlling a vehicle according to representative embodiments. Inputs 510 include a demanded or requested wheel power 512 and an available or demanded SOC power 514, which represents the power to be delivered or contributed by the electric motor based on the current SOC of the traction battery and the current operating mode. For example, the current operating mode may include a mode where the electric motor is not used to conserve traction battery power for a later trip or trip segment such that SOC power 514 would be zero. In an EV operating mode, the SOC power 514 may be used to satisfy the wheel power 512. In a hybrid or combination mode, wheel power 512 and SOC power 514 are used to determine an engine power request 516 based on the difference between the wheel power 512 and SOC power 514. The engine power request 516 is used to access the engine speed schedule (sea level) at 518. As previously described, the engine speed schedule may be implemented using a lookup table stored in memory or by one or more equations, for example.

The sea level engine speed is then compensated for current engine and ambient operating conditions as previously described. In the representative embodiment illustrated, the sea level engine speed is adjusted to provide altitude compensation at 520 and limited for NVH as represented at 530 as illustrated and described previously with reference to FIGS. 2 and 3. If the altitude compensated engine speed is below the NVH limit, the speed command 522 is provided to the ECU to control the engine speed so that the engine delivers sufficient torque to satisfy the wheel power 512. Otherwise, the currently available or attainable engine power is determined at 532. The difference between the attainable engine power and the requested engine power is determined at 534, and is used to reduce the requested wheel power at 536, which produces the wheel power request or demand at 540. As previously described, reduction of the demanded or requested wheel power prevents the SOC power 514 from increasing to meet the wheel power 512 and deplete the battery.

FIG. 6 is a block diagram illustrating operation of a system or method for controlling a vehicle having engine power feedback according to representative embodiments. The engine power feedback will attempt to correct for any engine power shortfall that results from limiting the altitude compensated engine speed. To account for the feedback control prior to the altitude compensation logic, the embodiment illustrated in FIG. 6 does not directly apply the altitude compensation engine speed limit. Rather, the system or method reduces the engine power demand by the same amount as the wheel power demand. The result is that the engine power demand is reduced to the level that is achievable at the desired engine speed limit for the altitude compensation. As such, the altitude compensation will not request an engine speed larger than the desired limit without being directly limited.

As shown in FIG. 6, the control system or method inputs 610 include desired or demanded wheel power 612 and electric motor or SOC power 614. The engine power request is determined based on the current operating mode and operating conditions as previously described such that the combined engine power request 616 and SOC power 614 provide the demanded wheel power 612. The engine power request 616 is used to determine an associated sea level engine speed at 618 subject to a corresponding speed limit at 630. The limited sea level engine speed is used to determine the corresponding available engine power at 632. A power reduction is determined at 634 based on the available engine power at 632 and the engine power request 616. The resulting power reduction reduces the engine power request at 642 and the wheel power command at 636 to provide a reduced wheel power at 640.

The engine power request at 616 is adjusted at 642 based on the power reduction 634 with engine power feedback provided at 644. As previously described, without the engine power reduction, the feedback at 644 would attempt to increase the engine power to achieve the originally requested engine power. However, in this embodiment, the engine power request is reduced based on the power reduction at 634 so that the resulting adjusted engine power request at 642 will be attainable at the engine speed limit 630 based on the sea level engine speed schedule at 646 and the altitude compensation applied at 648 to produce the resulting engine speed command at 650.

While representative embodiments are described above, it is not intended that these embodiments describe all possible forms of the claimed subject matter. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments may be described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an engine;
   first and second electric machines coupled to a traction battery and configured to operate primarily as a motor and a generator, respectively; and
   a controller in communication with the engine and the first and second electric machines and configured to increase target engine speed from a sea level speed to deliver a demanded engine power at altitude up to a noise, vibration, harshness (NVH) engine speed limit.

2. The vehicle of claim 1, the controller further configured to reduce the demanded engine power in response to the demanded engine power exceeding an engine power attainable at the NVH engine speed limit.

3. The vehicle of claim 2, the controller further configured to calculate the demanded engine power based on a difference between a demanded wheel power and a motor power.

4. The vehicle of claim 3, the controller further configured to reduce the demanded wheel power based on reducing the demanded engine power.

5. The vehicle of claim 1, the NVH engine speed limit based on the sea level speed.

6. The vehicle of claim 1, the NVH engine speed limit limiting engine speed only for sea level engine speeds below a corresponding sea level engine speed threshold.

7. The vehicle of claim 1, the controller further configured to:
   calculate engine power attainable at the NVH engine speed limit;
   reduce demanded engine power based on a difference between the engine power request and engine power attainable at the NVH engine speed limit; and
   reduce demanded wheel power in response to the reduced demanded engine power.

8. A controller-implemented method for controlling engine speed of a vehicle having an engine and first and second electric machines electrically connected to a traction battery, comprising:
   limiting engine speed to limit associated noise, vibration, and harshness (NVH) in response to engine speed being increased to deliver a demanded wheel power at operating conditions where attainable engine power is reduced relative to a calibrated engine power.

9. The method of claim 8 further comprising reducing demanded engine power in response to engine speed associated with the demanded engine power exceeding an NVH engine speed limit.

10. The method of claim 9 further comprising reducing the demanded wheel power based on the reducing of demanded engine power.

11. The method of claim 9 further comprising calculating the demanded engine power based on the demanded wheel power and an electric machine power associated with a current traction battery state of charge (SOC).

12. The method of claim 8, further comprising:
   reducing the demanded wheel power based on the engine power attainable at the limited engine speed associated with the NVH engine speed limit.

13. The method of claim 8, the operating conditions corresponding to reduced barometric pressure relative to barometric pressure at the calibrated engine power.

14. The method of claim 8, the operating conditions corresponding to degraded performance of an engine component.

15. A non-transitory computer readable storage medium having instructions executable by a vehicle controller, comprising instructions that:
   control engine speed in response to a demanded engine power based on a difference between a demanded wheel power and an electric machine power of a hybrid vehicle, the engine speed increased from a sea level engine speed to compensate for reduced engine power at current engine operating conditions, and limited based on a noise, vibration, harshness (NVH) threshold.

16. The computer readable storage medium of claim 15 further comprising instructions that reduce the demanded engine power based on an engine power attainable at the NVH threshold engine speed.

17. The computer readable storage medium of claim 16 further comprising instructions that reduce the demanded wheel power based on the reduced demanded engine power.

18. The computer readable storage medium of claim 15 further comprising instructions that control engine speed to an altitude compensated engine speed based on the sea level engine speed.

19. The computer readable storage medium of claim 15 further comprising instructions that:
   reduce the demanded engine power based on the NVH threshold engine speed; and
   reduce the demanded wheel power based on the reduced demanded engine power.

20. The computer readable storage medium of claim 15 further comprising instructions that compensate for reduced engine power associated with degradation of performance of an engine component.

* * * * *